June 14, 1960    R. J. SILVERMAN    2,940,589
CONTACT LENS CASE
Filed May 31, 1957
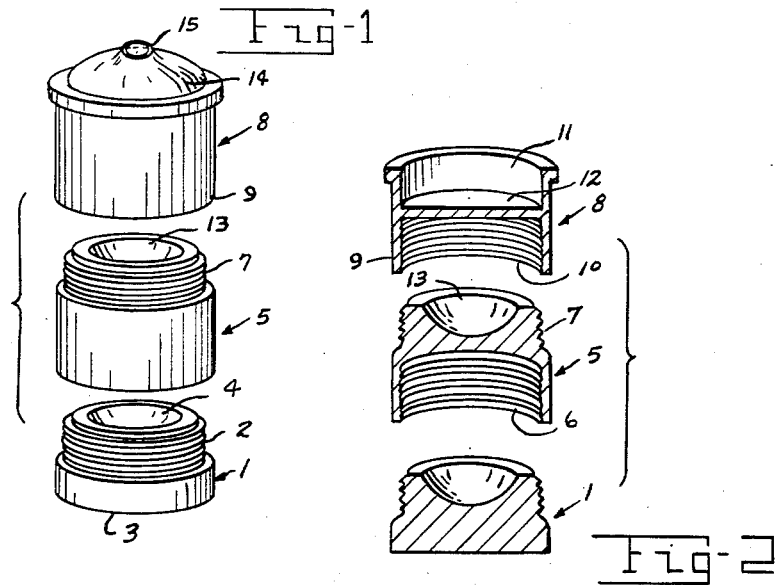
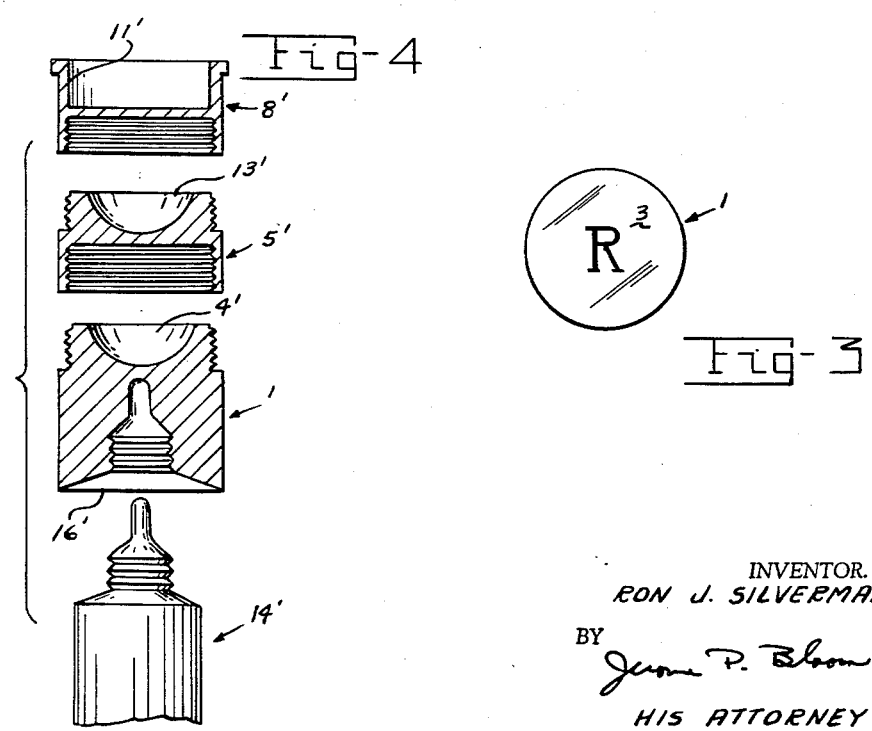
INVENTOR.
RON J. SILVERMAN
BY Jerome P. Bloom
HIS ATTORNEY 2,940,589
CONTACT LENS CASE
Ron J. Silverman, 4 E. 3rd St., Dayton 2, Ohio
Filed May 31, 1957, Ser. No. 662,648
5 Claims. (Cl. 206—5)

This invention relates to improvements in containers and more particularly to an improved contact lens case which also serves as a soaking kit and incorporates means facilitating the dispensing of wetting solution which is necessary for application to a contact lens prior to insertion in the eye. Embodiments of the invention are preferably fabricated of polyethylene to be shock resistant and liquid tight.

The use of contact lenses to correct sight deficiencies has increased substantially in recent years. Since the contact lenses are quite small and must be removed periodically for cleaning or storage, the handling of the lens elements by the wearer becomes an important problem. Standard equipment for the contact lens wearer, in accordance with the prior art, includes a lens case, a soaking kit, and a bottle of wetting solution. The wearer must keep all these items immediately available to take care of his daily needs. This creates a number of problems which are readily apparent. Moreover, the nature of the prior art cases and soaking kits is such that they create lens handling problems since the lenses are not readily removable therefrom.

The present invention provides improvements in lens cases which not only facilitates the handling of contact lenses but also integrates the elements of equipment of the prior art in a single efficient and economical case unit. Another feature of the invention is that it reduces the chances of confusing the contact lenses to an absolute minimum, even when the lenses are to be handled in the dark. Increased safety and protection are afforded to the contact lenses when stored in a lens case in accordance with the invention.

A primary object of the invention is to provide a simplified and improved container for contact lenses and the like, whereby such containers may not only be more economically manufactured, but will be more efficient and satisfactory in use, adaptable to a wide variety of applications, and offer maximum protection to articles contained therein.

A further object of the invention is to provide an improved liquid tight case for contact lenses.

Another object of the invention is to provide an improved compartmented case for storing contact lenses which also provides a soaking kit for the lenses.

An additional object of the invention is to provide an improved integrated kit for contact lenses consisting of nesting compartments particularly formed to facilitate safe and easy insertion and removal of the lens elements therefrom.

Another object of the invention is to provide an improved case for contact lenses which affords a soaking kit and enables integration of a fluid dispenser therein.

A further object of the invention is to provide an improved case particularly applicable to contact lenses consisting of stacked case sections affording bowl-like cavities for containing the lenses, with one of the sections being recessed to releasably connect a fluid dispenser.

Another object of the invention is to provide an improved contact lens case wherein a dispenser of wetting solution forms the base of a stacked case having cavities respectively accommodating contact lenses and wherein the uppermost surface of said case is recessed to frictionally seat the dispenser when it is in use.

A further object of the invention is to provide a case particularly applicable for protecting and servicing contact lenses possessing the advantageous structural features, the inherent meritorious characteristics and the mode of operation herein described.

With the above primary and other objects in view, as will more fully appear in the specification, the invention intended to be protected by Letters Patent consists of the features of construction, the parts and combinations thereof, and the mode of operation as hereinafter described or illustrated in the accompanying drawings or their equivalents.

Referring to the drawings, wherein are illustrated some but obviously not the only forms of embodiment of the invention, Fig. 1 is an exploded perspective view showing an embodiment of the invention;

Fig. 2 is a view similar to that in Fig. 1 but showing the elements in cross-section;

Fig. 3 is a bottom view of the device of Fig. 1; and

Fig. 4 is an exploded view of a further embodiment of the invention shown partially in section.

The invention can be best described with reference to the accompanying drawings. The embodiments of Figs. 1–3 consists of a cylindrical solid base element 1 having its uppermost end 2 slightly reduced in dimension and externally threaded. The bottom 3 of the base element is suitably inscribed with an "R" for purposes to be further described while the uppermost surface of the element 1 is centrally recessed to provide it with a bowl-like cavity 4.

A central cylindrical section 5 forms an extension vertically of the base element 1. The section 5 has its lowermost end cylindrically recessed and internally threaded at 6 to receive and threadedly engage to the upper end 2 of the base element to provide a liquid tight seal of the bowl-like cavity 4. The use of the flexible polyethylene in fabricating the case sections enables this liquid tight seal by its very character and properties. The upper end 7 of the section 5 is reduced in dimension and externally threaded similarly to the base element 1. It will be obvious that the lower portions of the base and central sections have the same external dimension and mate in integrated fashion.

A cylindrical cap section 8 having its lower end 9 cylindrically recessed and internally threaded at 10 has a further cylindrical recess 11 in its uppermost surface. The recesses 10 and 11 are separated by an integral transverse plate section 12. The cap section 8 has an external dimension identical with that of the lower portions of the case sections 1 and 5 and threadly engages over the upper end 7 of the section 5 to seal a bowl-like cavity 13 in the uppermost surface of the central section. It is noted that the external mating surfaces of the sections 1, 5 and 8 are uniformly knurled or suitably roughened to facilitate their handling.

Frictionally engaged to the cap section 8 in the recess 11 is a cylindrical squeeze bottle type fluid dispenser 14 having a normally sealed dispensing outlet 15.

The described structure thus provides a lens case having spaced sealed bowl-like cavities 4 and 13 and an external integrated fluid dispenser 14 containing wetting solution. The base cavity 4 receives the right hand lens while the central cavity 13 receives the left lens. The bowl-like configuration of the cavities enables the lens elements to be gently deposited therein and permits the lens elements to be easily slipped from the cavities, guided by the curving walls thereof.

In the use of the lens case, the identification on the bottom which can be seen and felt insures that where two lens elements are to be stored that the right lens will be in the bottom section. Thus, when the lens elements are to be applied, irrespective of the amount of light available, the wearer can remove the right lens by unscrewing the base element 1. The wetting solution which must be applied to the lens prior to insertion in the eye is immediately available at the top of the case assembly and can be readily dispensed from the case. When the right lens is applied, the central section 5 can be unscrewed and the wetting solution applied similarly. Both lens elements thus can be quickly and easily inserted in the eyes without a complicated handling procedure as required normally. Since the bottom of the base element 1 is unmistakable, the right lens may be inserted in the base cavity 4 on removal and the left will naturally be inserted in the cavity 13 of the central section.

If the lens elements are dirty and/or need soaking, the cavities need merely be filled with the fluid for soaking or storage and on assembly of the sections 1, 5, and 8 a fluid tight relation thereof enables the application of the lens case as a soaking kit. Thus, the need for separate soaking and dispensing units is completely eliminated in the use of the integrated assembly of the invention.

In the first embodiment of the invention the cap section 8 not only serves to seal the cavity 13 but also serves as a fluid dispenser housing. It is noted that the case sections can be color keyed to identify their contents and facilitate visual handling and if only one contact lens is to be stored, the central section 5 may be removed and the section 8 is directly applied to the base section 1 to provide a case having an integrated dispenser and affording a soaking kit as previously described. The case unit obtaining is simple, economical to fabricate, and overcomes the undesirable handling difficulties of the prior art devices enumerated.

A modification of the invention is shown in Fig. 4 of the drawings. The central section 5' and the cap section 8' shown therein are formed identically to the sections 5 and 8 described with reference to the embodiment of Figs. 1-3 of the drawings. The base element 1' is similar to the base element 1 and differs only in that the bottom of the element 1' has a central threaded recess 16' formed to threadedly engage over and cap a squeeze type dispenser 14' which actually forms the base of this embodiment of a lens case in accordance with the invention. Thus, for storage, the lens elements are stored in the bowl-like cavities 4' and 13' in the sections 1' and 5' which are provided with a liquid tight seal by assembly of the sections and the dispenser provides the base of the whole assembly.

For application of the lens elements or for soaking the dispenser can be unscrewed and frictionally seated in the recess 11' in the cap 8' and can be utilized as in the first described embodiment, if desired. Again, the elements are readily identified by sight or feel and the advantages enumerated previously as well as the mode of use remain the same. The use of polyethylene or similar material offers maximum protection to the lens elements against breakage or scratching and enables a liquid tight seal which automatically occurs on assembly of the separate elements of the case.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprises an illustrative form of several modes of putting the invention into effect and the invention is therefore claimed in any of its forms or modifications within the legitimate and valid scope of the appended claims.

Having thus described my invention, I claim:

1. A contact lens storage and soaking kit, comprising separably interconnected sections forming an integral structure including a first section having a bowl-like concavity accommodating a contact lens in its upper surface, a second section having a bowl-like concavity in its upper surface accommodating a contact lens, a third relatively flexible resilient section releasably housing a wetting or soaking solution for the contact lenses, said first and second sections being adapted to receive the wetting or soaking solution from the housing therefor in their bowl-like concavities.

2. A contact lens storage and soaking kit comprising separably interconnected sections forming an integrated structure including a first section providing a base for said kit releasably housing a wetting or soaking solution, a plurality of additional sections in capping relation to said first section respectively having bowl-like concavities in their upper surfaces respectively slidably receiving a contact lens therein and a cover forming a cap section for said kit and effecting a soaking chamber therein with at least one of said additional sections, at least said one of said additional sections being adapted to receive a charge of wetting or soaking solution from said base section for soaking the contact lens therein, the said base housing being formed of resilient, relatively flexible plastic and said cover being centrally recessed to provide a connector means thereon.

3. A contact lens storage and soaking kit comprising separably interconnected sections forming an integrated structure including a relatively flexible resilient section housing a wetting or soaking solution and other sections in superimposed relation defining a liquid tight bowl-like concavity accommodating a contact lens adapted to receive the soaking or wetting solution from the housing therefor which is integrally connected thereto.

4. A contact lens storage and soaking kit, comprising separably interconnected sections forming an integrated structure including a relatively flexible resilient section forming a base therefor, said resilient section housing a wetting or soaking solution for contact lenses, a pair of contact lens receptacles frictionally seated over said resilient section defining a pair of bowl-like concavities uppermost accommodating contact lenses therein and a cap element providing a top cover for said kit forming a soaking chamber thereby for said contact lenses.

5. A contact lens storage and soaking kit comprising interconnected sections forming an integrated structure including a relatively flexible resilient section housing a wetting or soaking solution and other sections connected to define at least one bowl-like concavity accommodating a contact lens adapted to receive the soaking or wetting solution from the housing therefor which is connected thereto.

References Cited in the file of this patent

UNITED STATES PATENTS

| | | |
|---|---|---|
| 496,554 | Duesbury | May 2, 1893 |
| 1,339,265 | Levitan | May 4, 1920 |
| 1,598,365 | Clarke | Aug. 31, 1926 |
| 2,100,173 | Rubens | Nov. 23, 1937 |
| 2,455,600 | Molumby | Dec. 7, 1948 |
| 2,496,093 | Iwata | Jan. 31, 1950 |
| 2,645,375 | Topfer | July 14, 1953 |
| 2,733,722 | Rodd | Feb. 7, 1956 |

FOREIGN PATENTS

| | | |
|---|---|---|
| 185,544 | Switzerland | Feb. 1, 1937 |
| 564,499 | Great Britain | Sept. 29, 1944 |
| 916,846 | France | Apr. 26, 1946 |
| 843,141 | Germany | July 7, 1952 |